A. LADD.
Hand-Seeder.
No. 57,734.
Patented Sept. 4, 1866.
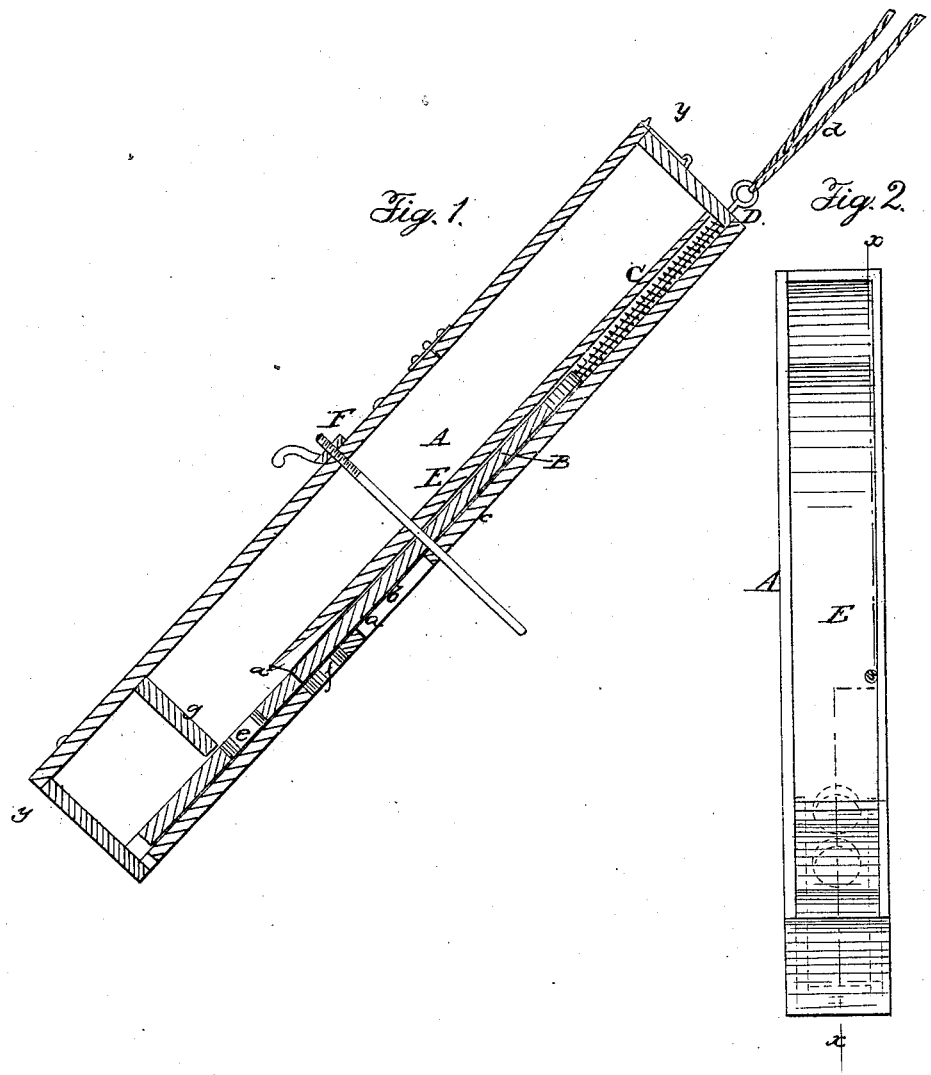

UNITED STATES PATENT OFFICE.

ALEXANDER LADD, OF ST. LAWRENCE, NEW YORK.

IMPROVEMENT IN CORN-PLANTERS.

Specification forming part of Letters Patent No. 57,734, dated September 4, 1866.

*To all whom it may concern:*

Be it known that I, ALEXANDER LADD, of St. Lawrence, in the county of Jefferson and State of New York, have invented a new and Improved Corn-Planter; and I do hereby declare that the following is a full, clear, and exact description thereof, which will enable others skilled in the art to make and use the same, reference being had to the accompanying drawings, forming part of this specification, in which—

Figure 1 is a longitudinal vertical section of my invention, taken in the line $x\,x$, Fig. 2; Fig. 2, a section of the same, taken in the line $y\,y$, Fig. 1.

Similar letters of reference indicate like parts.

This invention relates to a new and improved corn-planter, designed more especially to be applied to hoe-handles, so as to be used, in connection with a hoe, to admit of the corn being dropped and covered at one operation or manipulation.

A represents an oblong rectangular box, in which a slide, B, is fitted and allowed to work freely in a longitudinal direction, said slide having a pin, $a$, extending down from its bottom and passing through a longitudinal slot, $b$, in the bottom $c$ of the box A, said slot and pin determining the length of the movement of the slide. (See Fig. 1.) This slide B has a spiral spring, C, bearing against one end of it, said spring being on a rod, D, attached to the slide, and the rod passing through the upper end of the box, and having a cord, $d$, attached, for the purpose of drawing the slide upward, and a circular hole, $e$, is made in the slide, and a similar hole, $f$, made in the bottom of box A, the spring C having a tendency to keep the hole $e$ in the slide below and out of line with the hole $f$ in the bottom of box A, as will be fully understood by referring to Fig. 1.

The lower part of the slide B works under a partition, $g$, in the box A, the hole $e$ in the slide, when the latter is at its lowest point in the box, being just at the bottom of the partition.

E represents a false bottom, which is secured in the box A directly over the slide B, the bottom E extending down in the box A just below the line of the lower edge of the opening or hole $f$ in the bottom of box A. (See Fig. 1.) The lower end of this false bottom E is beveled or chamfered off at its under side, as shown at $a^*$.

The box A is secured to the hoe-handle at its lower part, the lower end of the box A being about an inch from the inner end of the ferrule. A clamp, F, is employed for attaching the box to the hoe-handle.

The corn to be dropped is placed in the box A, and when a dropping of corn is required the slide B is drawn up by pulling the cord $d$ so as to bring the hole $e$ in the slide over or in line with the hole $f$ in the bottom of box A, and the corn in the hole $e$ will be discharged through the hole $f$.

In this device no strike or cut-off is required to brush or move the superfluous corn from over the hole $e$. The hole $e$ becomes filled with corn when exposed in the box A, and the superfluous corn drops off as the slide B is drawn up, for it will be understood that the box when in use on a hoe has an inclined position. The beveled end of the bottom E prevents the corn binding or wedging in the hole $e$, for in such a case there is generally a kernel projecting (more or less) upward above the hole, and the beveled or chamfered surface of E will force the corn through the hole $e$ as said hole passes up underneath the chamfered surface of B.

The strikes or cut-offs hitherto employed for removing the superfluous corn off from the seed-holes or cells in reciprocating seed-slides are objectionable from the fact that they soon become worn and inefficient, and not unfrequently break the kernels of corn.

It will be understood that in my invention the corn itself in the box A serves as a strike or cut-off, for when the slide B is drawn up the corn in the hole $e$ will only rise with it.

Having thus described my invention, what I claim as new, and desire to secure by Letters Patent, is—

1. The slide B, provided with a hole, $e$, in combination with the box A and the hole $f$ in the bottom $c$ thereof, when said parts are arranged as shown and described, to admit of the dispensing with the ordinary strike or cut-off for depriving the hole $e$ of superfluous corn or seed, as set forth.

2. In combination with the box A and slide B, arranged as shown, the false bottom E, having its lower end beveled or chamfered at its under side, substantially as and for the purpose specified.

ALEXANDER LADD.

Witnesses:
G. N. FAIRMAN,
WM. H. GAIGE.